June 29, 1965  C. G. B. EKWALL  3,191,692
BACK HEAD OF PNEUMATIC TOOLS
Filed Nov. 20, 1961  3 Sheets-Sheet 3

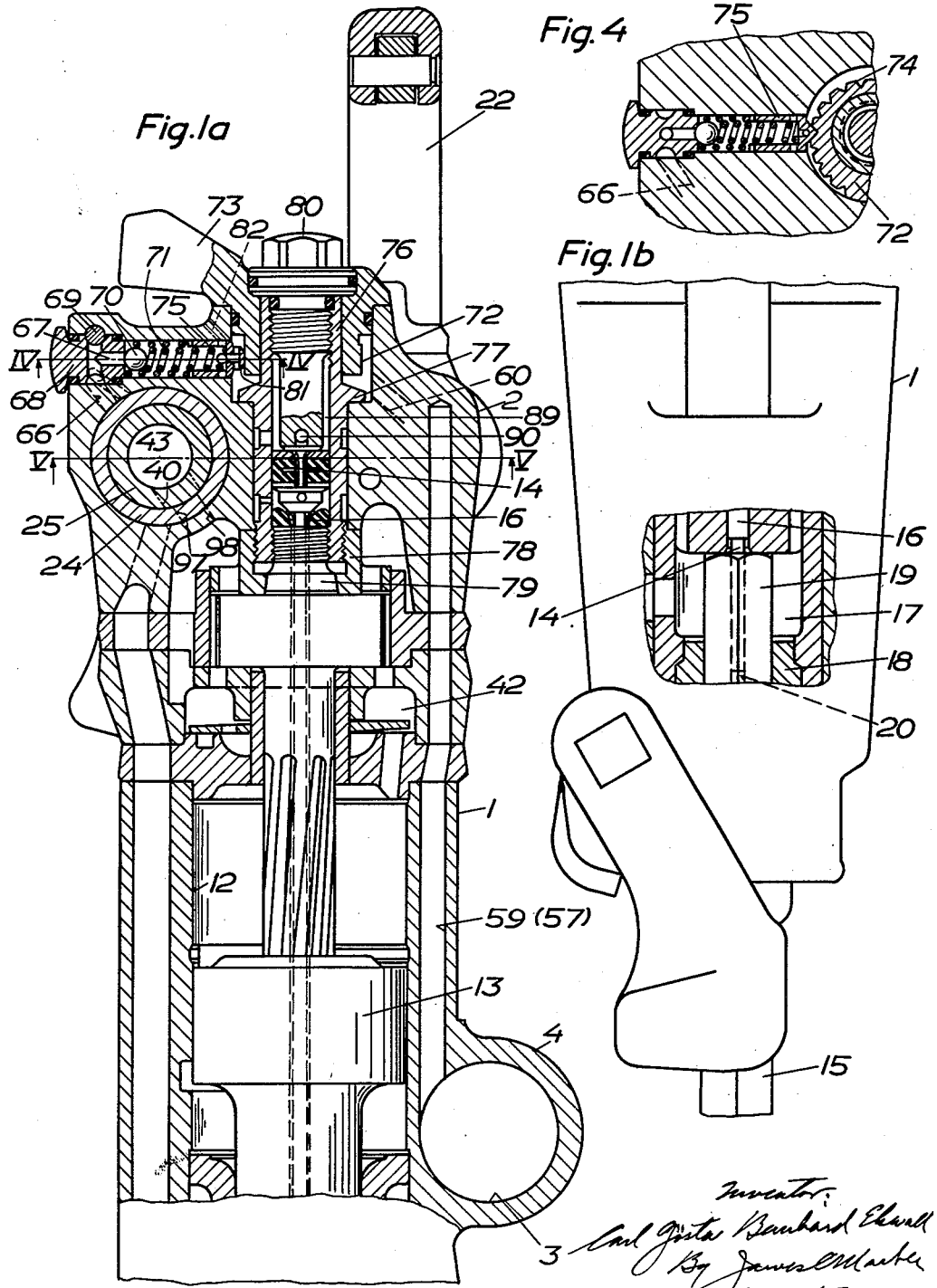

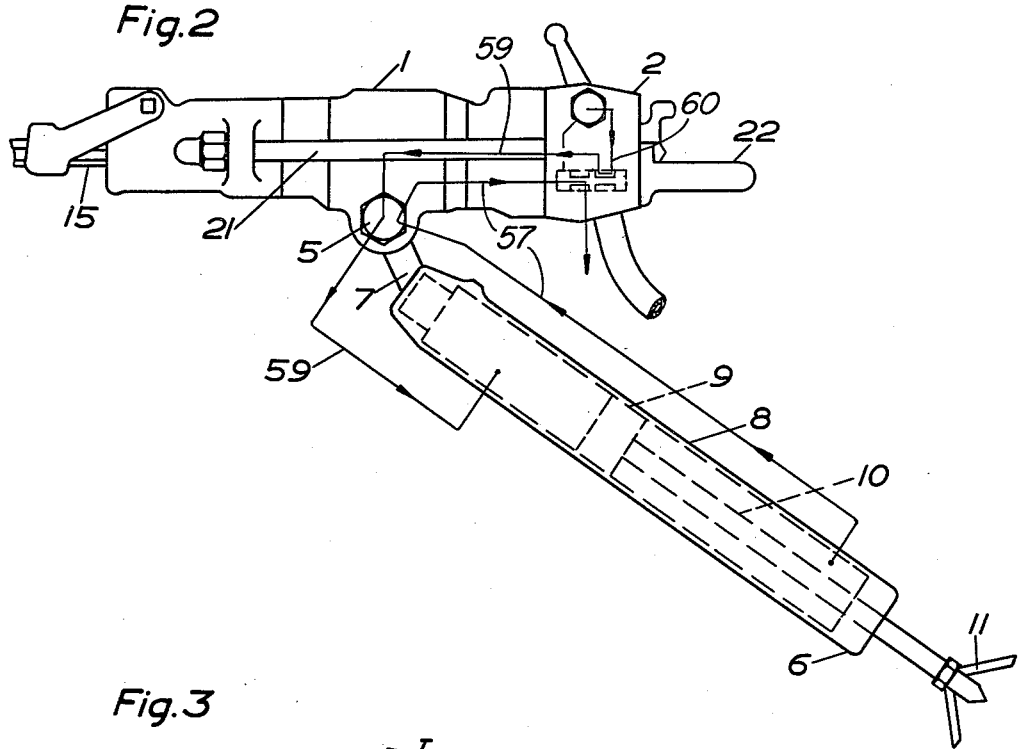
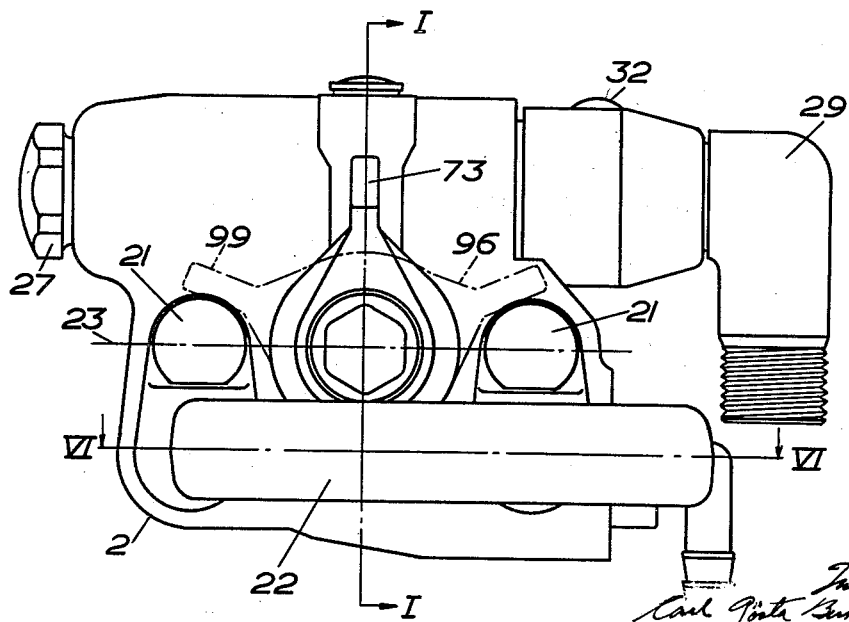

United States Patent Office 3,191,692
Patented June 29, 1965

3,191,692
BACK HEAD OF PNEUMATIC TOOLS
Carl Gösta Bernhard Ekwall, Nacka, Sweden, assignor to Atlas Copco Aktiebolag, Nacka, Sweden, a corporation of Sweden
Filed Nov. 20, 1961, Ser. No. 153,552
13 Claims. (Cl. 173—77)

This invention relates to rock drilling mechanisms comprising a pneumatic drill steel actuating motor such as a hand held drill, a rotary drill or a drill transmitting hammering and rotary action to a drill steel or drill tube and in which the motor is arranged for co-operation with a pneumatic feeding device such as a feed leg, a stoper or a drifter or the like serving to move the drill steel actuating motor towards the rock face to be drilled. The invention is particularly related to the back head of such pneumatic drill motors. There has for several years been a trend among manufacturers of pneumatic drill motors of the above type to concentrate operating members or levers necessary for the manipulation of the tool at the back head. This has made the back head a rather complicated part of the tool and has necessarily resulted in a back head of considerable volume, which also means that the weight of the back head has grown.

One object of the present invention is to simplify the back head and to arrange the various valves and other parts in the back head in such a manner that the volume of the back head is utilized to a greater degree than before for accommodation of the desired valve devices and other elements. A further object of the invention is to provide a back head which permits the back head to be manufactured by light material such as aluminum alloy, synthetic resin, fibre glass or the like. A still further object of the invention is to arrange the various supply conduits for pressure fluid, a handle and the necessary operating members in a manner which leaves one side of the tool free from such elements so that they do not interfere with the operator or his clothing.

Other characteristic features of the invention will become apparent from the following description of one embodiment of the invention which, however, should only be considered as an example and is by no means limiting for the scope of the invention as set forth in the claims.

Figure 5:
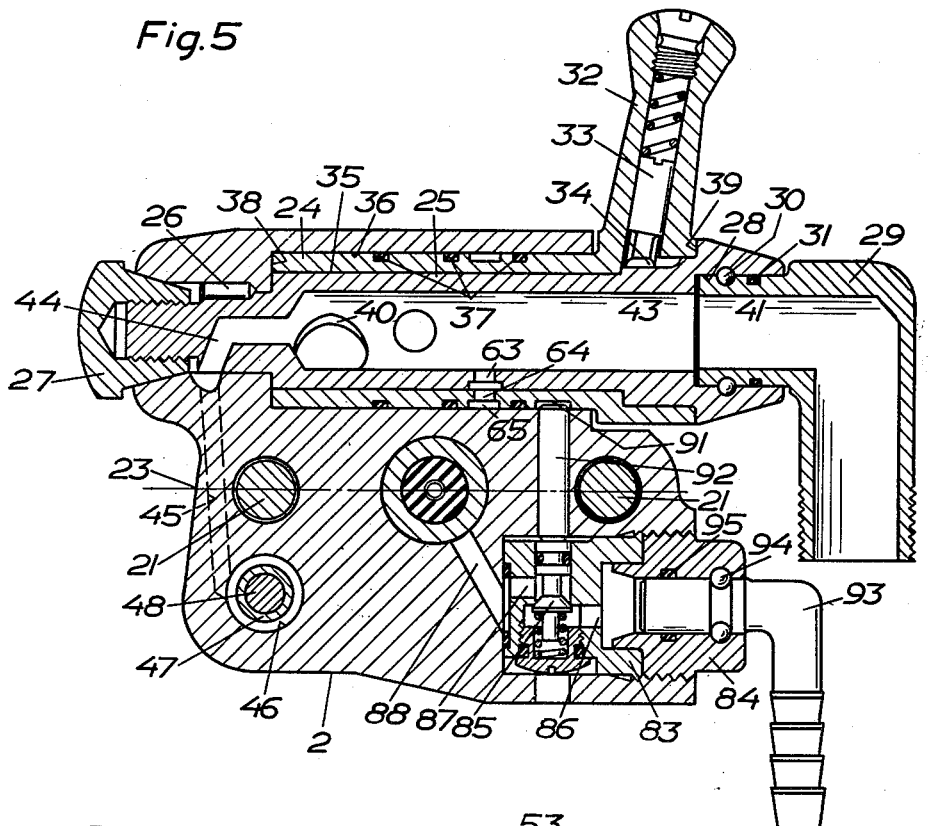
Figure 6:
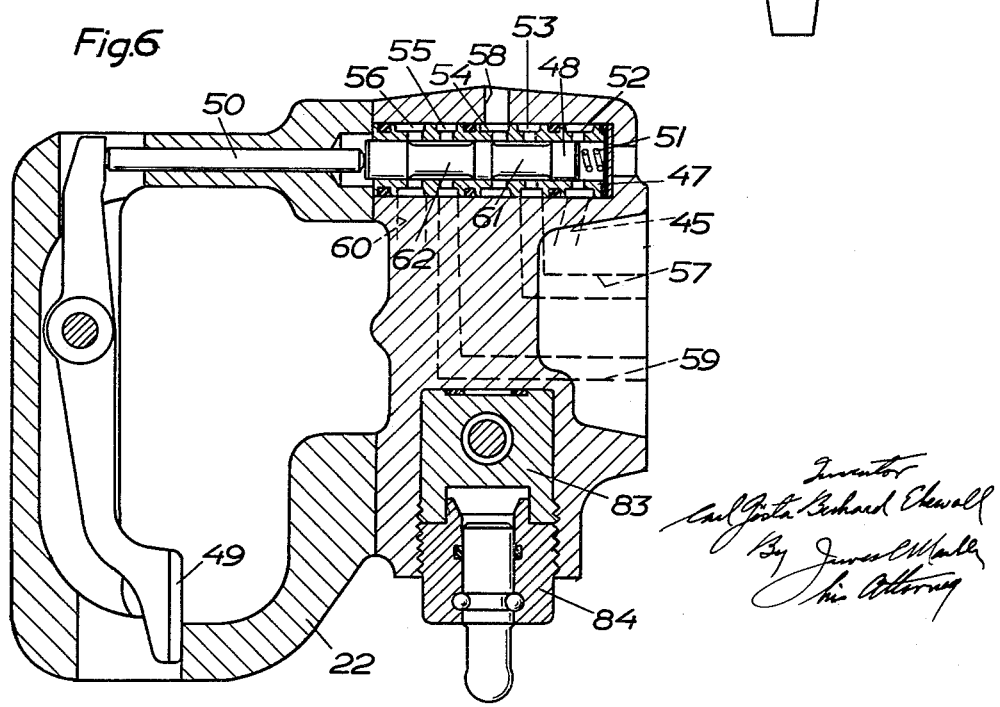

In the accompanying drawings FIGS. 1a and b show a side view partly in section of a drilling mechanism according to the invention. FIG. 2 is a diagrammatic side view of a pneumatic tool according to FIGS. 1a and b and a pertaining feed leg. FIG. 3 is a rear end view of the back head of the drilling mechanism according to FIGS. 1a and b. FIG. 1a is partly a section on line I—I of FIG. 3. FIG. 4 is a detail section on line IV—IV in FIG. 1a and FIG. 5 is a section on line V—V in FIG. 1a. FIG. 6 is a longitudinal section through the handle and back head on line VI—VI in FIG. 3.

The drilling mechanism illustrated in FIGS. 1a–6 is a pneumatic hammer rock drill adapted to be carried by a feed leg hinged to the drill by a transverse pivot at the upper end of the feed leg. With reference to FIGS. 1a–3 the drill comprises a cylinder casing 1 and a back head 2. The drill is provided with a bearing 3 formed by a lug 4 on the under side of the casing 1 of the drill and may swing on a transverse axis on a trunnion 5 carried by a feeding device 6 such as the expansible and retractable feed leg illustrated diagrammatically in FIG. 2. The feed leg may comprise a head 7 carrying the trunnion 5 and carried by a cylinder 8 accommodating a double acting piston 9 and a piston rod 10 carrying a foot piece 11 adapted to engage the ground or other suitable support. The feed leg is not described in detail since it does not form part of the invention and may, for instance, be of the design illustrated in British Patent 767,814 or the corresponding J. A. Larcen U.S. application 387,847, now Patent No. 3,085,638, filed October 23, 1953. The feeding device may naturally be of any other design in which pressure fluid is supplied through the back head for feeding or retracting the drill.

The casing 1 forms a working cylinder 12 for compressed air in which a hammer piston 13 is reciprocable. A flushing medium tube 14 extends through the drill to the drill steel 15 which is hollow in conventional manner. A second tube 16 encloses the tube 14 and extends from the back head 2 through the drill to a chuck chamber 17 as is well known in the art. 18 is a portion of the drill steel chuck which accommodates the noncircular shank 19 of the drill steel 15 in which the flushing medium passage 20 is formed. The casing 1 and the back head 2 are held together by two longitudinal side bolts 21 FIGS. 2, 3 and 5 in conventional manner. The back head is provided with a transversely extending handle 22, which is offset to one side and parallel with a longitudinal plane 23 through the centers of the side bolts 21. A tubular cylindrical main valve member 24 is rotatably mounted on a hollow stem 25, FIG. 5, fixedly secured in the back head 2 by means of a pin 26 and a nut 27 threaded on one end of the stem 25. The other end of the stem 25 is provided with a counter bore 28 accommodating a swivel connection 29 for a not illustrated compressed air hose. The swivel connection 29 is mounted in the counter bore 28 of the stem 25 by means of balls 30 and provided with a sealing ring 31, preferably an O-ring for easy swivelling. The main valve member 24 carries an operating member formed as a lever 32 at the same end of the main valve member as the swivel connection 29. A spring actuated plunger 33 movable longitudinally in the lever 32 cooperates with indents 34 on the stem 25 to arrest the main valve member in various positions of adjustment. The tubular main valve member 24 is rotatably fitted on the cylindrical portion 35 of the stem 25 with a sealing fit and for this purpose the valve member 24 is lapped together with the stem 25. The valve member 24 is on the other hand mounted with a light fit in the bore 36 in the back head 2 and sealed in said bore by means of sealing rings 37 and the main valve member is also arranged with a light fit between a shoulder 38 on the back head and a shoulder 39 on the stem 25, so that the main valve member is easily rotatable into various positions of adjustment and does not cause undue wear of the bore 36 in the back head 2. The main valve member 24 is provided with a port 97 which in suitable positions of the valve member may bring a port 40 in the hollow stem 25 and the compressed air supply 41 in communication with the admission chamber 42 of the drill motor through a passage 98. FIGS. 1a and 5. The stem 25 provides a supply passage 43 for compressed air. The stem 25 may be made of suitable hard and strong material such as hardened steel so as to keep wear and leakage between the stem 25 and the main valve member 24 at a minimum. The provision of the stem 25, furthermore, relieves the back head 2 from wear which would otherwise be caused by the frequent operation of the valve member 24. The stem 25 is provided with a passage 44 communicating through a passage 45 with a bore 46 accommodating a longitudinally fitted distributing valve sleeve 47 in which a distributing valve member 48 is slidable by means of a trigger 49 and a push rod 50 in the handle 22 against the action of a spring 51. The sleeve 47 has a number of external annular grooves 52, 53, 54, 55 and 56 communicating through the passage 45 with the compressed air supply passage 43, with the underside of the piston 9 of the feed leg through passages 57, FIG. 2, with the atmosphere through a vent passage 58, with the upper side of the feed leg piston 9 through passages 59, and with a pressure reduction valve through a passage 60, respectively. The passages 45, 57, 58, 59 and 60 are only shown in a diagrammatic way since the drawing would otherwise be too obscure. The distributing valve 48 has two reduced portions 61, 62 confined between annular lands on the distributing valve member 48. The annular space formed by the portion 61 alternately serves to vent the underside of the piston 9 of the feed leg to the atmosphere or to bring said underside into communication with the live air passage 45, and similarly the annular space formed by the reduced portion 62 serves to provide a communication alternately between the upper side of the piston 9 and the pressure reduction valve through the passage 60 or with the vent passage 58. In the position of the distributing valve illustrated in FIG. 6 compressed air of reduced pressure is supplied to the upper side of the piston 9 and simultaneously the underside of the piston 9 is vented to the atmosphere. When the trigger 49 is pressed and the distributing valve 48 is moved against the spring 51 venting of the underside of the piston 9 is interrupted and live air is instead supplied to the underside of the piston 9 and simultaneously the supply of compressed air from the pressure reduction valve to the upper side of the piston 9 is interrupted and said upper side is vented to the atmosphere thorugh the passage 58.

For the supply of compressed air of reduced pressure to the upper side of the piston 9 the stem 25 has a passage 63 communicating through a port 64 with an annular groove 65 in the main valve member 24. The groove 65 is in constant communication through a passage 66, FIG. 4, with passages 67 in a plug 68 secured in the back head by a pin 69. The passage 67 is controlled by a ball valve 70 acted on by a spring 71, the tension of which may be adjusted by suitable setting of a cam 72 rotatable by means of a handle 73 and provided with a number of indents 74 co-operating with a plunger 75 so that the cam 72 is arrested in various positions of adjustment. The cam 72 and the handle 73 are rotatably mounted on a stem 76 which has a flange 77 fixed to the back head 2 by a nut 78 and a screw 79. The cam 72 is kept on the stem 76 by a screw 80. The plunger 75 has a reduced portion 81 and when the plunger 75 rides on the highest portion of the cam 72, the reduced portion 81 causes the passages 60 to the distributing valve and the upper side of the piston 9 to be vented to the atmosphere through a passage 82.

For the supply of flushing water to the drill and the passage 20 in the drill steel a flushing water supply valve device 83 is fitted in the back head and held in position by a nut 84. The device 83 contains a spring loaded check valve 85 which controls a passage 86, 87, 88 leading to an annular chamber 89 communicating through a passage 90 with the flushing medium tube 14. The check valve 85 is operated by a cam groove 91, FIG. 5, on the main valve member 24 co-operating with a push rod 92, so that flushing medium is supplied to the drill as soon as the main valve member takes certain positions. Flushing medium is supplied through a swivel connection 93 which is mounted for rotation by means of balls 94 in the nut 84 and which is sealed by an O-ring 95.

It will be appreciated that all valve members in the back head as well as the swivel connections are mounted in elements adapted to minimize wear and rigidly secured in the back head 2 so that the back head 2 itself is relieved from wear by the moving valves or swivels. The back head is also substantially free from elements secured in the back head by screw threads. It is therefore possible to carry out the back head of light material such as aluminum alloy, synthetic resin or fibre glass reinforced resin, and the back head 2 may, for instance, comprise an aluminum alloy forging. The distribution valve 48 illustrated in the present embodiment may naturally be replaced by a rotatable distribution valve provided in a suitable fixed sleeve and for ease of operation the operating lever for the distributing valve may sometimes be placed remote from the handle so that it can not be operated unvoluntarily by an operator grasping the handle 22. The pressure reduction valve above described in connection with the back head enables setting of any desired pressure reduction for the feeding device without losses of pressure fluid for the pressure reduction from the position 96, FIG. 3, in which no pressure reduction is caused to the extreme postion 99 of the handle 73 in which the pressure reduction ball 70 is closed and the passages 82 are uncovered so that the upper side of the feed leg is vented to the atmosphere through the pressure reduction valve device.

The invention may be modified in several different ways by those skilled in the art within the scope of the following claims.

What I claim is:

1. In apparatus of the character described for controlling the supply and pressure of compressed air to the operating elements of a pneumatic tool having a cylinder casing and a pneumatic feeding device connected thereto for feeding said tool and a back head at one end of said cylinder casing, the combination which comprises a main valve in said back head for controlling supply of compressed air to said pneumatic tool and said feeding device therefor and including an external manual operating member for adjusting said main valve and disposed at one side of said back head, an external compressed air connection for introducing compressed air into said tool through said main valve and disposed on said back head at the same side thereof as said operating member is disposed, pressure reducing flow control valve means in said back head for controlling and regulating the supply and pressure of compressed air to said feeding device and being in flow communication with said main valve and said feeding device, means for spring loading said pressure reducing valve for throttling flow of compressed air therethrough, rotatable manual operating means for regulating said reducing valve and disposed on said back head adjacent said side thereof at which are disposed said manual operating means and said compressed air connection, cam means disposed adjacent said pressure reducing valve and at right angles thereto and rotatable in response to adjustment of said manual operating means for said reducing valve for adjusting the spring loading thereof in response to the angular positioning of said cam means, and means cooperating between said spring loaded reducing valve and said cam means for maintaining said cam means releasably in a particular angular positioning thereof.

2. Apparatus as recited in claim 1 in which said pressure reducing valve includes a slidable plunger and a ball valve spring loaded into closed position of said ball valve and disposed in said back head with said plunger engaging said cam means at right angles thereto for sliding movement of said plunger depending upon angular positioning of said cam means adjacent the end thereof, and a vent passage also controlled by the position of said plunger and disposed whereby air pressure downstream of said reducing valve is vented to the atmosphere when said cam means is in an angular position to urge said plunger to close said ball valve.

3. Apparatus as recited in claim 1 which also includes in said back head a flushing water connection at the same side of said back head as said compressed air connection and a water valve for controlling said supply of flushing water, and in which said rotatable cam means for said pressure reducing valve is disposed in said back head on a bushing through which said flushing water connection is assembled into said back head, and in which said manual operating means for said cam means is disposed on the rear surface of said back head.

4. Apparatus as recited in claim 1 which also includes distributing valve means for supplying compressed air from said main valve means selectively and alternatively from said pressure reducing valve to said feeding device for feeding movement thereof and directly from said main valve means to said feeding device for retraction thereof, and manual operating means for selecting which of said alternatives is supplied by said distributing valve means and disposed on said back head adjacent said operating member for said main valve means and said operating member for said reducing valve means.

5. Apparatus as recited in claim 1 and including a first bore in said back head, a counter-bore in said back head coaxial with said first bore and extending therefrom to form an abutment therebetween, a trunnion disposed in said bore and extending into said counter-bore with a shoulder disposed thereon against said abutment and forming said main valve, a screw-threaded extension on said trunnion extending out of said counter-bore, a nut disposed between said extension and said back head for holding said trunnion in said counter-bore, and a valve control member rotatably disposed on said trunnion in said first bore for rotation therearound and control of said main valve.

6. Apparatus as recited in claim 5 in which said trunnion has an air passage disposed longitudinally therethrough, and in which there is a nipple rotatably disposed in said trunnion at the end thereof opposite said extension and extending out of said casing for receiving an air supply hose thereon.

7. In apparatus of the character described for controlling the supply and pressure of compressed air to the operating elements of a pneumatic tool having a cylinder casing and a pneumatic feeding device connected thereto for feeding said tool and a back head at one end of said cylinder casing, the combination which comprises a bore in said back head and extending transversely to the longitudinal axis of said cylinder casing and spaced therefrom, a main valve member rotatably mounted in said bore and extending therein forming therewith valve means for controlling supply of compressed air to said pneumatic tool upon rotation of said valve member to various angular positions in said bore, a manual operating member for rotating said valve member in said bore and extending from said back head at one side thereof, an external compressed air connection for introducing compressed air into said bore and said main valve member and disposed on said back head extending from the same side thereof where said operating member is disposed, spring loaded pressure reducing valve means in said back head and disposed in flow communication between said main valve and said feeding device for controlling supply and pressure of compressed air supplied through said back head to said feeding device, said pressure reducing valve including a slidable plunger and throttling valve means disposed in said back head and slidable therein for said pressure reducing control of pressure, rotatable cam means engaging said plunger at right angles thereto for regulating the position thereof and of said throttling valve means in said back head, the axis of said plunger and of said rotatable cam means being substantially perpendicular to the axis of said bore and said main valve means, manual operating means for adjusting the angular position of said cam means and disposed externally of said back head at the rear face thereof whereby manipulation of said member and rotation of said cam means adjusts the spring loading of said reducing valve means, and means cooperating between said spring loaded plunger and said cam means for maintaining said cam means releasably in any of a plurality of angular positions thereof.

8. In apparatus of the character described for controlling the supply and pressure of compressed air to the operating elements of a pneumatic tool, the combination which comprises a first bore in said tool, a counter-bore in said tool coaxial with said first bore and having a smaller internal diameter to form an abutment between said bores, a hollow stem member mounted in said first bore and extending into said counterbore, a shoulder disposed on said member for bearing against said abutment, a screw-threaded extension on said hollow stem member extending out of said counter-bore, a nut threadably engaged with said extension for holding said hollow stem member in said counter-bore with said shoulder against said abutment, a valve control member rotatably disposed on said hollow stem member in said first bore for rotation therearound and forming therewith means for controlling supply of compressed air to said pneumatic tool upon rotation of said valve control member to various angular positions around said stem member, a nipple rotatably disposed in said hollow stem member and extending out of said tool for receiving air supply thereto, regulating valve means in said tool and disposed in flow communication with said nipple for controlling supply and pressure of compressed air supplied through said tool, and manual operating means connected to said regulating valve means and disposed on said tool for adjusting the supply of compressed air thereto.

9. Apparatus as recited in claim 8 in which said hollow stem member has a longitudinal air passage therethrough in flow communication with said nipple and a transverse port communicating wtih said longitudinal passage, and in which said valve control member comprises a cylindrical sleeve portion which is rotatably journaled on said hollow stem member in said first bore and provided with a port whereby rotation of said sleeve around said stem member brings said ports alternatively into and out of register.

10. Apparatus as recited in claim 8 in which said valve control member has disposed thereon a cam extending circumferentially therearound, a flushing medium supply passage extending through said back head to said pneumatic tool, a control valve disposed in said flushing medium supply passage adjacent said cam portion whereby rotation of said valve control member selectively and alternatively opens and closes said flushing medium supply passage.

11. In control apparatus of the character described for controlling operations of a pneumatic tool, the combination which comprises a bore in said tool having an abutment at one end thereof, a cylindrical member disposed in said bore, said cylindrical member having a shoulder disposed thereon for engagement with said abutment and an extended portion extending beyond said shoulder, securing means disposed on the extended portion of said cylindrical member on the side opposite said shoulder for maintaining said shoulder secured against said abutment, control means rotatably disposed on said cylindrical member in said bore, and means adjacent said control means and responsive to the different angular positions thereof around said bore for controlling the operations of said tool.

12. Apparatus as described in claim 11 in which said control means is a sleeve rotatably journaled on said cylindrical member and in which said sleeve has a cam portion extending along the outer circumferential surface thereof for engaging said responsive means in different angular positions of said sleeve around said cylindrical member.

13. Apparatus as described in claim 12 in which said responsive means includes a spring-urged plunger urged toward said cam surface for responding to various angular positions thereof and said control means around said cylindrical member.

References Cited by the Examiner

UNITED STATES PATENTS

| | | | |
|---|---|---|---|
| 1,551,098 | 8/25 | Gilman | 173—78 |
| 1,596,873 | 8/26 | Gilman | 173—78 |
| 1,979,551 | 11/34 | Huffman | 137—530 |
| 2,260,979 | 10/41 | Morin et al. | 137—625.24 |
| 2,587,421 | 2/52 | Willach | 137—530 |
| 2,657,709 | 11/53 | Gillerstrom et al. | 137—530 |
| 2,725,854 | 12/55 | Lear | 173—78 |
| 2,908,482 | 10/59 | Curtis et al. | 173—161 |
| 3,011,569 | 12/61 | Dick | 173—158 |
| 3,085,638 | 4/63 | Larcen | 173—36 |

FOREIGN PATENTS

| | | |
|---|---|---|
| 1,059,029 | 3/52 | France. |
| 767,814 | 2/57 | Great Britain. |
| 812,315 | 4/59 | Great Britain. |

BROUGHTON G. DURHAM, *Primary Examiner.*

RALPH H. BRAUNER, *Examiner.*